Oct. 10, 1933.    A. W. LAIRD    1,929,927
METHOD OF AND SYSTEM FOR LEACHING MATERIAL
Filed Jan. 8, 1930
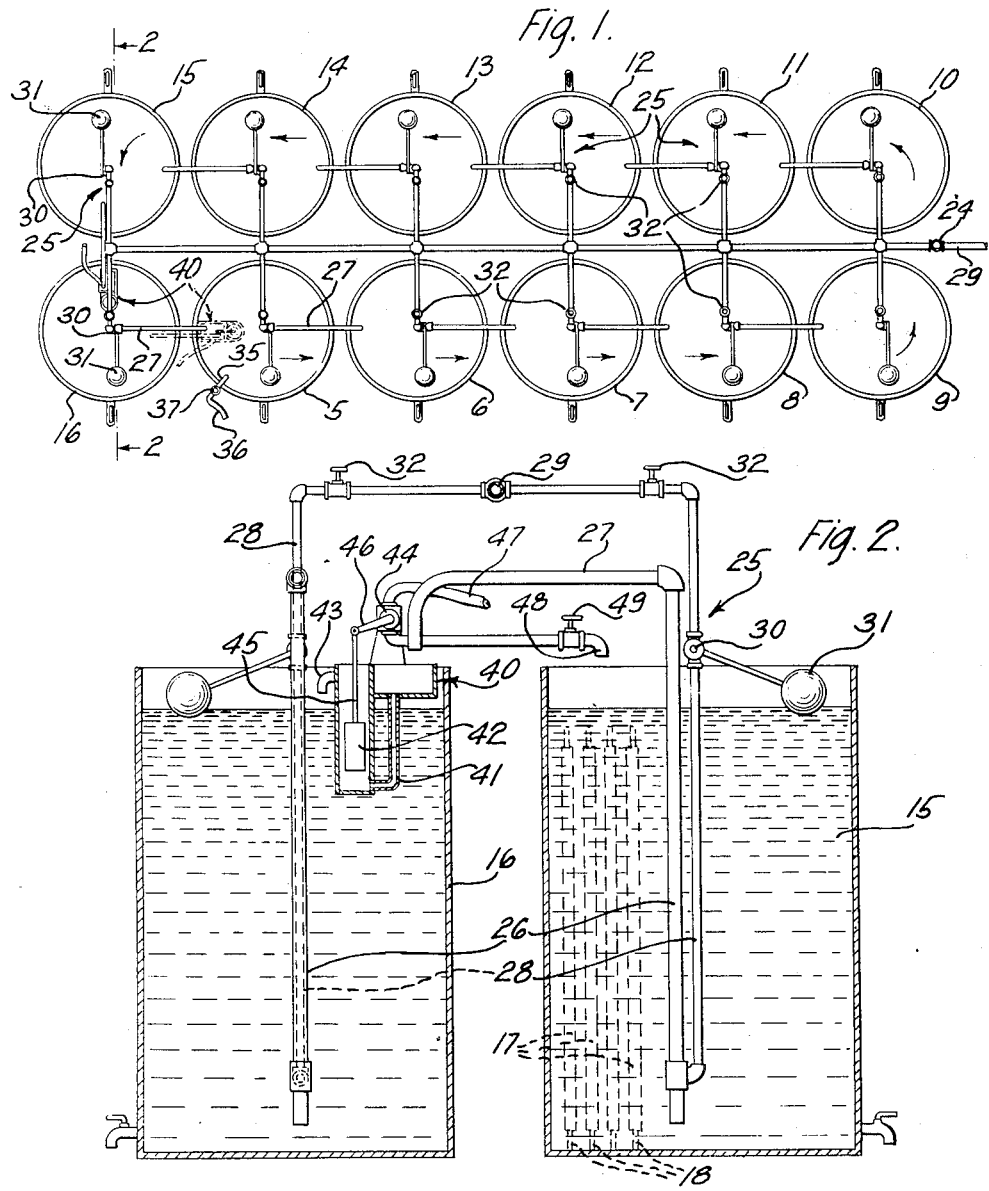
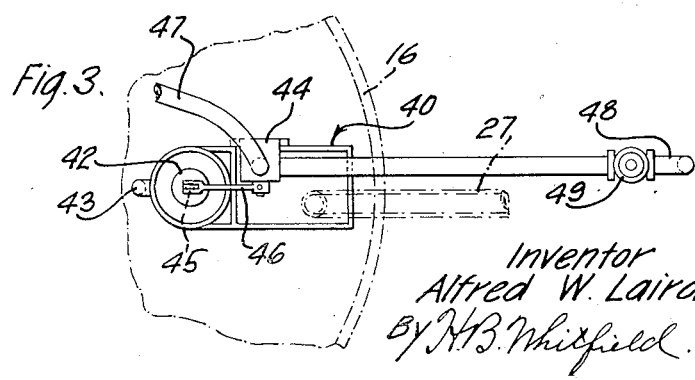
Inventor
Alfred W. Laird
By H.B. Whitfield, Atty.

Patented Oct. 10, 1933

1,929,927

UNITED STATES PATENT OFFICE 1,929,927

METHOD OF AND SYSTEM FOR LEACHING MATERIAL

Alfred W. Laird, Chicago, Ill., assignor to Western Electric Company, Incorporated, New York, N. Y., a corporation of New York Application January 8, 1930. Serial No. 419,264

7 Claims. (Cl. 23—268)

This invention relates to a method of and system for leaching material to remove or recover soluble substances therefrom.

In the leaching of material it has been the practice in some instances, such as in the leaching of zinc chloride from parchmentized or vulcanized articles, to place the articles in receptacles containing a zinc chloride solution of a given specific gravity and at predetermined intervals to reduce the specific gravity by removing a part of the solution and adding water. The use of such a method results in loss of time and requires considerable manual effort and attention on the part of the operator to control the concentrations of the solutions.

In an effort to overcome some of these disadvantages the continuous counter-current system was devised, wherein the leaching water is continuously advanced successively through receptacles in series so that the fresh water first comes into contact with the most completely leached material and then into contact with material in intermediate stages of leaching until it finally passes over unleached material.

The principal objects of the invention are to provide a simple method of and an efficient and economical system for leaching material.

Recent studies conducted on the rate of leaching zinc chloride from vulcanized or parchmentized articles have shown that approximately half of the total zinc chloride is removed by allowing unleached articles in the last receptacle to come to equilibrium with a zinc chloride solution of a predetermined specific gravity. In order to remove this amount of zinc chloride and at the same time maintain the specific gravity constant it is required that about half of the total leaching water used in the system be added to the receptacle containing newly introduced unleached articles. As a result of these studies an improved method of leaching has been instituted and constitutes the present invention.

In accordance with one embodiment, the invention contemplates the provision of a countercurrent system, whereby the method of leaching may be practiced, consisting of a plurality of receptacles which contain articles manufactured from fiber treated with zinc chloride and which are equipped with float-controlled air lifts for advancing only a portion of the total water through the receptacles in series so that the solution of zinc chloride gradually increases in specific gravity as it advances through the system. The solution of zinc chloride passes from the last receptacle containing the most recently treated articles through a control box into an adjacent empty receptacle and a valve within the box is controlled by the specific gravity of the solution to introduce the remainder of the fresh water in the last receptacle containing articles to maintain the solution therein at a predetermined specific gravity to expedite the economical leaching of the articles. When the articles in the first receptacle, located at the anterior end of the system, are suitably leached they are removed and another lot of unleached articles is introduced into the system at the posterior end.

Other objects and advantages of the invention will become apparent from the following detailed description, taken in conjunction with the accompanying drawing, in which Fig. 1 is a plan view of an apparatus representing one embodiment of the invention;

Fig. 2 is an enlarged vertical sectional view taken on line 2—2 of Fig. 1, and

Fig. 3 is an enlarged fragmentary plan view of the automatic control box, shown in Fig. 2, for regulating the flow of fresh water into the leaching solution in the receptacle containing the most recently treated articles at the posterior end of the system.

Referring now to the drawing in which similar parts are designated by the same numerals in the several views, the system includes twelve receptacles 5—16, eleven of which (5 to 15, inclusive) contain vulcanized or parchmentized articles such as tubes 17—17 formed of paper which has been impregnated with zinc chloride and wound around mandrels 18—18, shown in dotted lines in Fig. 2. The twelfth receptacle 16, located at the posterior end of the system, receives the leaching fluid which has become a solution of zinc chloride after having passed seriatim through the receptacles 5 to 15, inclusive. Each of the receptacles is provided with an airlift device 25 which comprises a vertical pipe 26 open at its lower end and connected at its upper end to a pipe 27 extending over and bent downward to discharge fluid flowing therethrough into the adjacent more posterior receptacle. Connected near the lower end of the pipe 26 is a pipe 28 leading from a horizontal pipe 29 which is common to all of the airlift devices and is connected through a valve 24 to any suitable supply of air under pressure (not shown). A hand valve 32 is provided in each of the pipe lines 28 and these hand valves are all open except the valve associated with receptacle 16 which is closed to prevent the passage of the leaching solution into receptacle 5. The passage of compressed air through each of the pipes 28 in each receptacle is controlled by a valve 30 which is operated by a float 31 so that a continuous flow of a portion of the total leaching fluid to be used may be maintained through the receptacles in the direction of the arrows as illustrated in Fig. 1.

Approximately half of the total leaching water is admitted into the receptacle 5 at the anterior end of the system by any suitable means, such as a bent pipe 35 adapted to hook over the edge of the receptacle and connected by a flexible tubing 36 to any suitable supply of water under pressure. A valve 37 in the pipe 35 is used for controlling the rate at which the water is supplied.

A removable control box 40, suspended within the last receptacle 16 which is empty and located at the posterior end of the system, is positioned beneath the discharge pipe 27 of the adjacent receptacle 15 containing the most recently treated articles. As the water admitted to receptacle 5 containing the most thoroughly leached tubes is carried seriatim through the receptacles by means of the airlift devices, it becomes a solution of zinc chloride and upon this solution being discharged through the pipe 27 into the control box 40 it passes through a pipe 41 thereof, then upwardly past a hydrometer type of float 42 through an outlet pipe 43 into the receptacle 16 which contains no tubes. The float 42 is adjusted so that when the specific gravity of the solution passing through the control box is greater than a predetermined value, a valve 44 (Fig. 2) is operated by the float 42 through a link 45 and an arm 46 to permit the required quantity of water to flow from a source of supply (not shown) through a flexible tube 47 and a pipe 48 and a valve 49 therein into the receptacle 15 which contains unleached articles most recently introduced into the system. Should the specific gravity of the solution vary from a predetermined value, the float 42 either rises or falls and operates the valve 44 so as to cause a resultant change in the quantity of water entering the last receptacle, thereby adjusting the specific gravity of the solution to the desired value.

In operation, the system is adapted to function in a continuous manner so that unleached articles and leached articles may be placed in the receptacles or removed therefrom, respectively, without affecting other articles which are in intermediate stages of the leaching process. Thus, as illustrated by Fig. 1, the water supply pipe 35 is hooked over the edge of the receptacle 5 containing the most thoroughly leached paper tubes 17 and fresh water is admitted at a predetermined rate equivalent to approximately half of the total quantity of leaching water to be used in the system. As the water rises in the receptacle, the float 31 operates the valve 30 to permit compressed air to pass through the pipes 28, 26 and 27, thereby lifting the water through the pipes 26 and 27 into the adjacent more posterior receptacle 6. In a similar manner the airlift device 25 in each receptacle advances the leaching water seriatim through the receptacles until it passes from the receptacle 15 through the control box 40 into the empty receptacle 16.

The receptacle 15 contains freshly made unleached tubes 17, and since approximately half of the total zinc chloride in the paper tubes is removed by first having them come to equilibrium with a solution of zinc chloride having a specific gravity of approximately 1.3, it has been found that a highly efficient method of leaching is obtained by adding approximately half of the total water used in the system to the receptacle 15 through automatic regulation of the water flow by the control box 40. As the leaching fluid traverses the system through receptacles 5 to 15 it gradually increases in zinc chloride content and according to the specific gravity thereof, the hydrometer-like float 42 of the control box 40 effects the actuation of the valve 44 to admit sufficient fresh water to maintain the specific gravity of the solution in tank 15 at approximately 1.3. After the tubes in receptacle 5 have been leached sufficiently, valves 24, 37 and 49 are closed to discontinue the supply of water and air. The leached tubes are then removed from receptacle 5 and a new lot of unleached tubes placed in receptacle 16 from which the solution of zinc chloride has been transferred along with the solution from receptacle 5 to a suitable recovery apparatus (not shown). The water supply pipe 35 is then transferred from receptacle 5 to receptacle 6 and the control box 40 is removed from receptacle 16 and suspended in receptacle 5, as shown by dotted lines in Fig. 1, thereby to control the quantity of water to be introduced into receptacle 16 which will now hold a new lot of unleached tubes. The hand valve 32 associated with receptacle 5 is then closed and valve 32 of receptacle 16, along with valves 24, 37 and 49, are opened to permit the proper advancement of leaching fluid through the system.

The above cycle of operations is repeated every time a lot of leached tubes is removed from the system and a new lot of unleached tubes is introduced, the water supply pipe 35 and the control box 40 being advanced from their receptacles with which they are associated to their adjacent posterior receptacles.

Although the invention hereinbefore described and illustrated is particularly well adapted for leaching zinc chloride from fibrous material, it will be understood that the invention is capable of many other modifications and applications without departing from the spirit and scope of the invention as defined by the appended claims. For example, the invention is not to be limited to adding the remainder of the leaching fluid to any particular receptacle, since in leaching different materials the additional fluid might be added at any desired point in the system to maintain a solution at any predetermined specific gravity.

What is claimed is:

1. A method of leaching a parchmentizing or vulcanizing agent from material treated with a solution thereof, which consists in placing separate lots of the material in receptacles, advancing a leaching fluid through the receptacles and maintaining the specific gravity of the fluid at approximately 1.3 within one of the receptacles.

2. A method of leaching zinc chloride from articles treated therewith, which consists in advancing seratim a leaching fluid through separate lots of the articles, and adding fresh fluid to the leaching fluid in contact with one of the lots of the articles being leached whenever the specific gravity of the leaching fluid rises above a certain value.

3. A method of leaching zinc chloride from paper articles treated therewith, which consists in placing the articles in a plurality of individual receptacles, advancing a portion of the total water to be used progressively from the receptacle with articles containing the least proportion of zinc chloride to the receptacle with articles containing the greatest proportion of zinc chloride to form a solution of zinc chloride, and adding the remainder of the water in the receptacle containing the articles having the greatest amount of zinc chloride to be removed.

4. A method of leaching zinc chloride from material treated therewith, which consists in advancing water seratim through separate lots of material in various stages of leaching, the progression of the water being in the direction of the material containing the greatest amount of zinc chloride, and adding a quantity of fresh water to the lot of material containing the greatest amount of the zinc chloride to be removed to obtain a solution of approximately 1.3 specific gravity.

5. In a leaching system, a plurality of receptacles for retaining material to be leached, portable means for adding a fluid to any one of the receptacles, means for advancing the fluid through the receptacles, and means controlled by the specific gravity of the fluid for adding additional fluid to a receptacle associated with said portable means.

6. In a leaching system, a plurality of receptacles for holding separate lots of material to be leached, portable means for supplying a portion of the total water to be used to the receptacle containing the most thoroughly leached material, means for advancing the water seriatim through the receptacles to form a solution of the substance to be removed, the progression being in the direction of the material containing the greatest amount of the substance to be removed, and means controlled by the specific gravity of the solution for adding a quantity of fresh water to the receptacle containing the material having the greatest amount of substance to be removed.

7. In a leaching system, a plurality of receptacles for holding separate lots of material to be leached, portable means adapted to be associated with any of said receptacles for adding a fluid thereto including a cylindrical portion, means for supplying fluid from the receptacle associated with said portable means to said cylindrical portion, and means controlled by the specific gravity of the fluid in said cylindrical portion for controlling the quantity of fluid added to said receptacle associated therewith.

ALFRED W. LAIRD.